United States Patent [19]
Wagner et al.

[11] Patent Number: 5,139,416
[45] Date of Patent: Aug. 18, 1992

[54] GAS BURNERS, PARTICULARLY FOR GLASS MELTING FURNACES

[76] Inventors: Manfred Wagner, Bergwiesenstrasse 13; Helmut Pieper, Buchenstrasse 19, both of 8770 Lohr/Main, Fed. Rep. of Germany

[21] Appl. No.: 762,471

[22] Filed: Sep. 19, 1991

[30] Foreign Application Priority Data
Oct. 13, 1990 [DE] Fed. Rep. of Germany ....... 4032582

[51] Int. Cl.⁵ .............................................. F23D 14/62
[52] U.S. Cl. .................................... 431/354; 431/158; 239/417; 239/499
[58] Field of Search ...................... 239/417, 416.5, 499; 431/354, 158

[56] References Cited
U.S. PATENT DOCUMENTS
1,318,160 10/1919 Lindsay ................................ 239/417
1,650,627 11/1927 Hopkins ............................... 239/417

Primary Examiner—Carroll B. Dority
Attorney, Agent, or Firm—Rosen, Dainow & Jacobs

[57] ABSTRACT

A gas burner used in glass melting furnace comprising a mixing tube having a perforated mixture for mixing fuel gas with air inspirated by gas flow, means for supplying fuel gas to the mixing tube and an inspiration tube located in the mixing tube. The perforated mixer is situated inside the mixing tube at the end of the inspiration tube. The gas burner also comprises a means for moving the air inspiration tube longitudinally with respect to the mixing tube and a seal located between the perforated mixer and the inside surface of the mixing tube to allow the perforated mixer to move longitudinally with respect to said mixing tube.

7 Claims, 1 Drawing Sheet

Fig. 1
Fig. 2
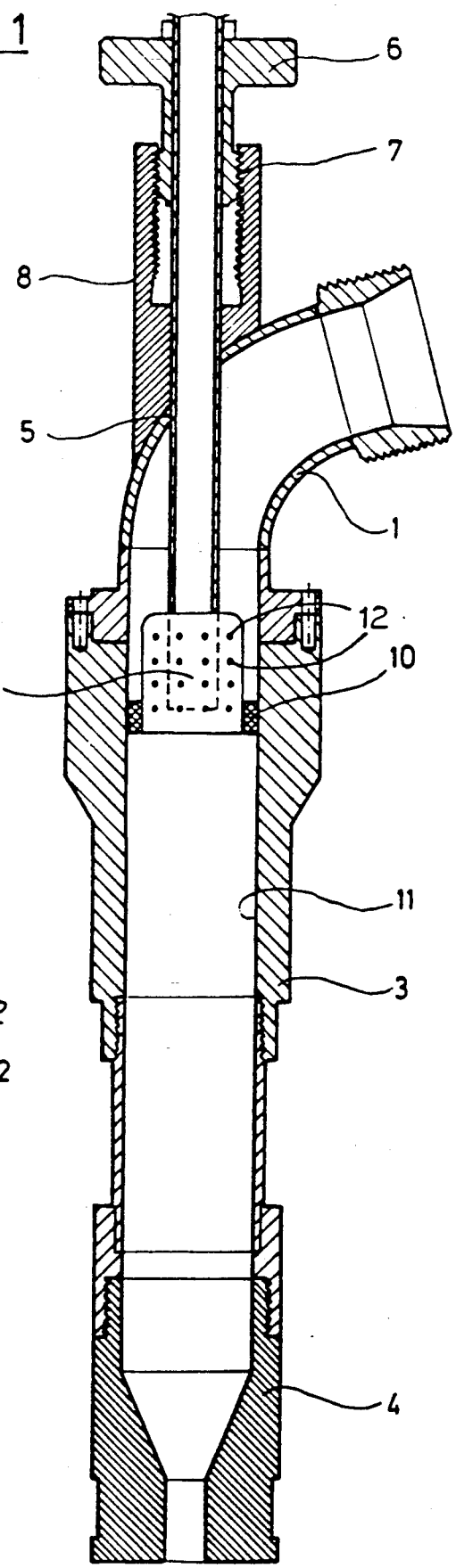
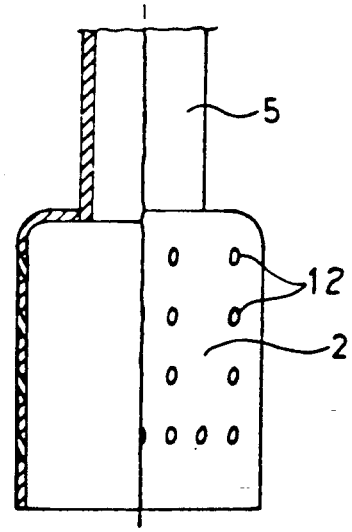

GAS BURNERS, PARTICULARLY FOR GLASS MELTING FURNACES

The invention concerns a gas burner, particularly for glass melting furnaces, with a mixing tube containing a perforated mixer for mixing the gaseous fuel with air inspirated by the gas flow.

A large number of different types of burners are available for use in melting furnaces, in particular for glass melting furnaces. These burners suffer from a number of disadvantages, including the high number of components required, with the costs associated with such number of components, the high noise level and the difficulties involved with optimum setting, A simple burner (DE-AS 1 280 460) is also known, but this is used merely to ignite gas and cannot be controlled as is necessary for a melting furnace.

The aim of the invention is to produce a gas burner which does not have the above mentioned disadvantages. In particular the invention should reduce the number of components, which results in a reduction in cost and an increase in reliability. Furthermore the subject of the invention should reduce the emitted noise level, give better carburization and therefore require less induced air than conventional burners, and give a stable flame with optimum combustion. The adjustment of the burner during operation should be simple, whereby the burner setting can be visually checked by means of the sight windows which are to be found on all glass melting furnaces.

These aims are achieved in the invention by means of a perforated mixer which is installed inside the mixing tube and which is mounted at the end of a moveable air inspiration tube. The air inspiration tube can move in the direction of its longitudinal axis. A sealing ring is provided between the inside surface of the mixing tube and the perforated mixer, which allows the perforated mixer to move with the air inspiration tube in the direction of the longitudinal axis of the tube.

In the preferred form of the invention the outlet end of the mixing tube is narrowed by means of an outlet nozzle, which helps to create a stable flame. Also in the preferred form the openings in the casing of the perforated mixer are much smaller than the opening of the air/gas mixture outlet ($<1\%$).

In order to permit simple manual adjustment the preferred form of the invention includes a male thread on the outside of the air inspiration tube which is inserted in a female thread in the burner body, and a hand wheel at the outer end of the tube. These items may be used to adjust the longitudinal position of the inspiration tube.

When several burners are operated in parallel the flame lengths of the individual burners can be varied by adjustment of the perforated mixer.

In order to improve air inspiration the air inspiration tube can be extended as far as the boundary of flow inside the perforated mixer.

It is a particular advantage of the present invention that adjustment is made directly with the air inspiration tube, so that there are no non-cooled parts inside the burner, and that the adjustment is immediately effective.

In the following description an example of the invention is explained with reference to a longitudinal section of such a burner.

FIG. 1 shows the longitudinal section and

FIG. 2 shows another perforated mixer design.

The gas burner consists of a burner body, which in the main consists of a mixing tube 3 and a gas inlet connection 1, which is connected to the inlet end of the mixing tube 3. An outlet nozzle 4 is situated at the outlet end of the mixing tube 3.

An air inspiration tube 5, which is arranged concentrically to the mixing tube 3, leads into the gas inlet connection 1. The air inspiration tube ends in a perforated mixer 2, which is designed as a cylinder. The body of the perforated mixer 2 has a large number of openings 12, all of which are small in size. The holes are less than 1% of the size of the outlet opening of the perforated mixer 2.

A seal 10 is installed between the perforated mixer 2 and the inside wall 11 of the mixing tube 3, to prevent gas passing through the gap between the perforated mixer and the inside wall of the mixing tube, whilst permitting longitudinal movement of the perforated mixer 2 for burner adjustment.

The air inspiration tube 5 is threaded into the burner body 8 at its outer end. When the air inspiration tube is rotated by means of a hand wheel 6 provided at its outer end both the air inspiration tube and the perforated mixer are moved in a longitudinal direction with respect to the burner body. As a result of this movement a larger or smaller number of openings 12 in the perforated mixer 2 are made available for the gas entry. In this way the gas/air ratio can be adjusted precisely and simply.

In the perforated mixer 2 the stream of gas from the gas inlet connection 1 is split into a defined number of partial streams, which align themselves along the longitudinal axis inside the perforated mixer. In this way the partial vacuum necessary for the inspiration of the air through the air inspiration tube is formed, whereby the resistance to the air flow is low, so that the air supply is sufficient even when the gas flow is low.

The separate gas streams are mixed perfectly with the inspirated air in the perforated mixer 2 and the mixing tube 3, whereby the noise which normally occurs at a valve needle, or in the gas nozzle is not produced in the invention.

Furthermore the angular turbulence of gas and air caused by a valve body is avoided, so the flame becomes luminous.

In a further version of the invention the perforated mixer can be replaced by a piece of tube, which has the same outside diameter as the perforated mixer and an internal diameter which corresponds to the internal diameter of the air inlet.

Holes are provided at a certain angle in this piece of tubing, so that the gas entering the air tube produces an injector effect in the air tube.

Repositioning of the piece of tube produces a variation of the splitting up of the gas flow, and a change in the amount of air inspirated, which therefore influences the length of the flame.

The invention can therefore be described as being an ideal solution to the practical problems.

We claim:

1. A gas burner especially for glass melting furnaces comprising:

a mixing tube having a perforated mixer for mixing fuel gas with air inspirated by gas flow;

means for supplying fuel gas to said mixing tube;

an inspiration tube located in said mixing tube, said perforated mixer situated inside said mixing tube at the end of said inspiration tube;

means for moving said air inspiration tube longitudinally with respect to said mixing tube; and a seal located between said perforated mixer and an inside surface of said mixing tube to allow said perforated mixer to move longitudinally with respect to said mixing tube.

2. The gas burner according to claim 1, wherein said mixing tube having an open end and being narrowed to form an outlet nozzle toward said open end of said mixing tube.

3. The gas burner according to claim 2, wherein said perforated mixer having openings in a body thereof, said openings being smaller than said open end of said mixing tube.

4. The gas burner according to claim 3 wherein said air inspiration tube being inserted in said perforated mixer.

5. The gas burner according to claim 4 wherein said air inspiration tube having male threads on the outside thereof and having a hand wheel on the outside thereof and located at a top of said male threads.

6. The gas burner according to claim 5, wherein said openings in said perforated mixer being angled towards an outlet opening of said perforated mixer.

7. The gas burner according to claim 6, wherein said air inspiration tube ends at said perforated mixer.

* * * * *